(12) United States Patent
Nezami et al.

(10) Patent No.: US 12,185,157 B2
(45) Date of Patent: Dec. 31, 2024

(54) SUBSCRIBER/SERVICE BASED RADIO ACCESS NETWORK RELIABILITY

(71) Applicant: Telefonaktiebolaget LM Ericsson (publ), Stockholm (SE)

(72) Inventors: Yashar Nezami, Ottawa (CA); Norbert Ghersin, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/642,052

(22) PCT Filed: Sep. 18, 2019

(86) PCT No.: PCT/IB2019/057881
§ 371 (c)(1),
(2) Date: Mar. 10, 2022

(87) PCT Pub. No.: WO2021/053372
PCT Pub. Date: Mar. 25, 2021

(65) Prior Publication Data
US 2024/0056870 A1 Feb. 15, 2024

(51) Int. Cl.
*H04W 28/02* (2009.01)
(52) U.S. Cl.
CPC ............................... *H04W 28/0268* (2013.01)
(58) Field of Classification Search
CPC ..... H04W 36/0022; H04W 4/40; H04W 8/04; H04W 72/56; H04W 76/27; H04W 4/90; H04W 76/50; H04W 72/04; H04W 12/06; H04W 72/02; H04W 60/00; H04W 76/11; H04W 8/08; H04W 76/00; H04W 72/12; H04W 84/042; H04W 92/18; H04W 4/46; H04W 76/14; H04W 72/20; H04W 4/06

See application file for complete search history.

(56) References Cited

U.S. PATENT DOCUMENTS

| | | | |
|---|---|---|---|
| 9,265,085 B2 * | 2/2016 | Wang | H04L 5/0055 |
| 9,622,164 B2 * | 4/2017 | Kim | H04W 12/02 |
| 10,111,147 B1 * | 10/2018 | Prasad | H04L 43/0823 |
| 10,356,680 B1 | 7/2019 | Kollar et al. | |
| 10,616,936 B2 * | 4/2020 | Velev | H04W 24/08 |
| 10,721,767 B2 * | 7/2020 | Kim | H04W 36/0044 |
| 10,945,300 B2 * | 3/2021 | Velev | H04W 24/08 |
| 10,972,913 B2 * | 4/2021 | Kim | H04W 4/40 |
| 11,026,284 B1 * | 6/2021 | Belser | H04L 69/28 |

(Continued)

OTHER PUBLICATIONS

PCT International Search Report and Written Opinion mailed May 8, 2020 for International Application No. PCT/IB2019/057881, 12 pages.

*Primary Examiner* — Jung Liu
(74) *Attorney, Agent, or Firm* — Sage Patent Group

(57) ABSTRACT

Methods and systems for performing admission control include receiving an indication of at least one service reliability target associated with at least one service and determining whether one of the at least one service reliability targets is met. If the one of the at least one service reliability targets is met, an initial context associated with the service is configured. The at least one service reliability targets may be received with an initial context setup request message and responded to with either an initial context setup failure message or an initial context setup response message.

17 Claims, 10 Drawing Sheets

(56) References Cited

U.S. PATENT DOCUMENTS

| | | | |
|---|---|---|---|
| 11,039,310 B2* | 6/2021 | Kim | H04W 76/11 |
| 11,838,944 B2* | 12/2023 | Kim | H04W 36/0077 |
| 2015/0189689 A1* | 7/2015 | Wang | H04W 4/70 |
| | | | 370/329 |
| 2015/0271087 A1 | 9/2015 | Yiu et al. | |
| 2016/0234850 A1* | 8/2016 | Freda | H04W 72/563 |
| 2018/0352593 A1* | 12/2018 | Velev | H04W 76/12 |
| 2019/0215863 A1* | 7/2019 | Kim | H04W 36/06 |
| 2019/0230723 A1 | 7/2019 | Kim et al. | |
| 2019/0335532 A1* | 10/2019 | Kim | H04W 76/00 |
| 2019/0394625 A1* | 12/2019 | Kim | H04W 36/0022 |
| 2020/0236723 A1* | 7/2020 | Velev | H04L 67/12 |
| 2021/0235267 A1* | 7/2021 | Kim | H04W 36/0022 |
| 2021/0352522 A1* | 11/2021 | Hwang | H04W 28/0278 |
| 2024/0107577 A1* | 3/2024 | Kim | H04W 74/02 |

\* cited by examiner

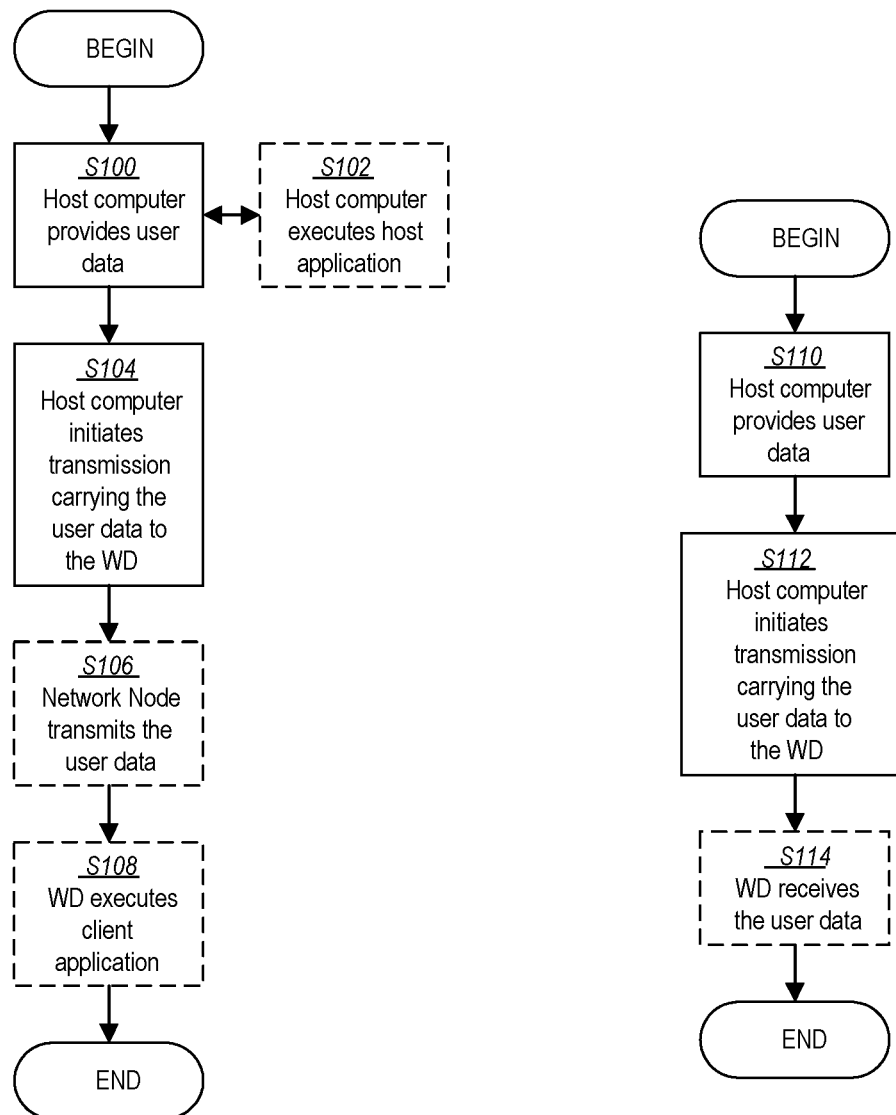

| Reliability Metric | Target (Minimum Level) |
|---|---|
| Mission Critical Push-to-Talk Service Reliability | 99.9999% |
| Mission Critical Data Service Reliability | 99.9999% |
| Mission Critical Video Service Reliability | 99.9999% |
| Cell Reliability | 99.999% |
| QCI Performance Reliability | 99.999% |
| PDCP Reliability | 99.9999% |

| Service 1 | Target 1 |
| Service 2 | Target 2 |
| Service 3 | Target 3 |

118

| Scenario # | Targets met by node | Context Setup Message Result |
| --- | --- | --- |
| 1 | 1, 2, 3 | Success |
| 2 | 1, 3 (2 not met) | Failure |
| 3 | 1 (2 and 3 not met) | Failure |
| 4 | None | Failure |

FIG. 12

SUBSCRIBER/SERVICE BASED RADIO ACCESS NETWORK RELIABILITY

CROSS-REFERENCE TO RELATED APPLICATIONS

This application is a 35 U.S.C. § 371 national stage application for International Application No. PCT/IB2019/057881, entitled "SUBSCRIBER/SERVICE BASED RADIO ACCESS NETWORK RELIABILITY", filed on Sep. 18, 2019, the disclosures and contents of which are hereby incorporated by reference in their entireties.

TECHNICAL FIELD

Wireless communications and in particular, subscriber and/or service-based radio access network reliability based at least in part on reliability level(s) such as minimal reliability levels.

BACKGROUND

The Third Generation Partnership Project (3GPP) 4th Generation (4G) Long Term Evolution (LTE) and $5^{th}$ Generation (5G) New Radio (NR) standards for general functionality and Mission Critical Communication (MCC) only include a few references to reliability. In these standards, reliability is defined in the context of network packet layer transmissions, as the ability to successfully deliver network layer packets to a system entity, within the time constraints required by the targeted service. Reliability is also referred to in the standards with regard to a requirement for a reliable mechanism to transmit the same information to multiple User Equipment (UE) or wireless device (WD) instances, i.e., the reliable distribution of data. The ability to decouple communication priorities from reliability such as a Quality of Service (QoS) characteristic is also referred to in the standards. Further, the network may provide service reliability and the ability to prioritize resources to meet the service requirements set forth in the standards and the network may ensure reliable communication with the latency required for a service. Several NR scenarios may require very high communications service availability, i.e., communications service reliability.

In the 3GPP, 4G and 5G standards, categorization with respect to different levels of reliability is defined only from the perspective of broadband capability for data applications, at the Transport Layer level. In the case of LTE/NR cell overload, Access Class Barring (ACB) can be utilized to permit network access only for wireless devices associated with specific Access Classes (ACs), like Security Services (Class 12), Public Utilities (Class 13), Emergency Services (Class 13), etc.

Further, network operators may expect RAN solutions to meet various minimum reliability requirements in a consistent and differentiated manner. Traditional reliability models have focused on hardware product reliability, including concepts like Mean Time Between Failures (MTBF) and Mean Time to Failure (MTTF). While there is interest in hardware reliability, ultimately it is the reliability of services like VoIP, PTT, video, etc. that may be more important. Services typically rely on hardware but also other kinds of resources. When a specific hardware resource becomes unavailable, directly affecting hardware reliability, the service associated with the resource in question may be only partially affected, or not at all, for example because of a resource redundancy. This means that service reliability may be a more appropriate concept in many circumstances.

3GPP standards refer to reliability generically, with no definitions or specific numbers provided, as an important aspect of some functionalities. 3GPP Release 16 defines a specific type of reliability—Communication Service Reliability and introduces an MCC model and services. This indicates the need for differentiated handling in terms of reliability with respect to certain wireless device categories. For example, reliability requirements for a public safety wireless device are expected to be more stringent than in the case of a typical wireless device. Existing support in the standards for differentiated handling is defined only at the Transport Layer level, based on Quality of Service Class Identifiers (QCIs).

What the 3GPP, 4G and 5G standards are missing is a mechanism for differentiated network behavior by different categories encompassing all aspects of reliability mentioned above, as well as new ones such as service reliability, essentially the ability to guarantee a minimum level of availability (e.g. 99.999% (referred to as 5-9s or N-9s where N=5, since the value includes five 9s) or 99.9999% (6-9s)) for a specific Service like Push-to-Talk (PTT).

SUMMARY

Some embodiments advantageously provide methods and systems directed toward subscriber and/or service-based radio access network (RAN) reliability based at least in part on reliability level(s) such as minimal reliability level guarantees performed during admission control. Accordingly, a model based at least in part on minimal reliability level guarantees, applicable to one or more aspects of reliability specified by the 3GPP standard, i.e. network packet layer transmissions, communications service availability, data distribution, prioritized resource allocation, etc., and to specific services, like PTT, is provided.

The model may be based on reliability profiles, each one including specific levels (N-9s) for reliability aspects, i.e., may include one or more service reliability targets. A mechanism allows operators to define reliability profiles for current and future MCC use cases. A mechanism also allows a wireless device to indicate to a network node the desired reliability profile at the time of the Initial Context Setup Request. Further, a mechanism may be provided to allow service reliability-based wireless device admission control. A collection of mechanisms implemented by the network node allow the node to use information from the reliability profile to meet the expected reliability level in one or more aspects and optimize hardware and software requirement allocation and usage. Key Performance Indicators (KPIs) and metrics describing the actual reliability levels in the communication system may be used to monitor the performance of the communication system.

According to one aspect of the disclosure, a method is performed by a network node during admission control. An indication of at least one service reliability target associated with at least one service is received. A determination is performed whether one of the at least one service reliability targets is met. If the one of the at least one service reliability targets is met, an initial context associated with the service is configured.

According to one or more embodiments of this aspect, if the one of the at least one service reliability targets is met, transmission of an indication that the initial context associated with the at least one service has been configured is caused. According to one or more embodiments of this aspect, if the one of the at least one service reliability targets is not met, transmission of an indication that the initial context associated with the at least one service has not been configured is caused. According to one or more embodiments of this aspect, the receiving of the indication of at least one service reliability target associated with at least one service includes receiving, from an MME, an initial context setup request message. According to one or more embodiments of this aspect, if the one of the at least one service reliability targets is not met, the MME is sent an initial context setup failure message.

According to one or more embodiments of this aspect, the initial context setup failure message includes a list of reliability levels supported by the node, the list comprising a reliability level for each service associated with the at least one service reliability targets. According to one or more embodiments of this aspect, if the one of the at least one service reliability target is met, transmission of an initial context setup response message to the MME is caused. According to one or more embodiments of this aspect, the at least one service reliability target is included in a reliability profile and the method further comprises using the reliability profile to allocate system resources based at least in part on at least one of an existing guaranteed reliability level for a service type, a resource availability status, a resource level of utilization, an ability of different configurations to meet different existing guaranteed reliability targets and a differentiated wireless device handling feature.

According to one or more embodiments of this aspect, key performance indicators of reliability levels obtained when operating based at least in part on the at least one service reliability target are monitored. According to one or more embodiments of this aspect, each of the at least one service reliability targets corresponds to a maximum reliability value required for any bearer associated with an initial context request. According to one or more embodiments of this aspect, determining whether the at least one service reliability target is met further includes computing an existing guaranteed reliability level for the at least one service associated with the at least one service reliability target and comparing the existing guaranteed reliability level to the at least one service reliability target. According to one or more embodiments of this aspect, the indication of at least one service reliability target is received from a wireless device in association with an initial context setup request.

According to another aspect of the disclosure, a network node is provided. The network node includes processing circuitry configured to, during admission control, receive an indication of at least one service reliability target associated with at least one service, determine whether one of the at least one service reliability targets is met and, if the one of the at least one service reliability targets is met, configure an initial context associated with the service.

According to one or more embodiments of this aspect, the processing circuitry is further configured to, if the one of the at least one service reliability targets is met, cause transmission of an indication that the initial context associated with the at least one service has been configured. According to one or more embodiments of this aspect, the processing circuitry is further configured to, if the one of the at least one service reliability targets is not met, cause transmission of an indication that the initial context associated with the at least one service has not been configured.

According to one or more embodiments of this aspect, the receiving of the indication of the at least one service reliability target includes receiving, from an MME, an initial context setup request message. According to one or more embodiments of this aspect, the processing circuitry is further configured to, if the one of the at least one service reliability targets is not met, send the MME an initial context setup failure message. According to one or more embodiments of this aspect, the initial context setup failure message includes a list of reliability levels supported by the network node, the list comprising a reliability level for each service associated with the at least one service reliability targets.

According to one or more embodiments of this aspect, the processing circuitry is further configured to, if the one of the at least one service reliability targets is met, cause transmission of an initial context setup response message to the MME. According to one or more embodiments of this aspect, the at least one service reliability target is included in a reliability profile and the processing circuitry is further configured to use the reliability profile to allocate system resources based at least in part on at least one of an existing guaranteed reliability level for a service type, a resource availability status, a resource level of utilization, an ability of different configurations to meet different existing guaranteed reliability targets and a differentiated wireless device handling feature. According to one or more embodiments of this aspect, the processing circuitry is further configured to monitor key performance indicators of reliability levels obtained when operating based at least in part on the at least one service reliability target.

According to one or more embodiments of this aspect, each at least one service reliability target corresponds to a maximum reliability value required for any bearer associated with an initial context request. According to one or more embodiments of this aspect, determining whether the one of the at least one service reliability targets is met further includes computing an existing guaranteed reliability level for the at least one service associated with the at least one service reliability target and comparing the existing guaranteed reliability level to the at least one service reliability target. According to one or more embodiments of this aspect, the processing circuitry is further configured to receive, from a wireless device, the indication of at least one service reliability target in association with an initial context setup request.

According to another aspect of the disclosure, a method is performed by an MME during admission control is provided. The MME is configured to communicate with a network node. Transmission, to the network node, of an indication of at least one service reliability target associated with at least one service is caused. An indication of whether one of the at least one service reliability targets is met is received from the network node.

According to one or more embodiments of this aspect, the at least one service reliability target is provided by a wireless device. According to one or more embodiments of this aspect, the causing of transmission of the indication includes sending, to the network node, an initial context setup request message. According to one or more embodiments of this aspect, one of an initial context setup failure message and an initial context setup response message is received where the indication of whether the one of the at least one service reliability targets is met being provided by one of the initial context setup failure message and the initial context setup response message.

According to one or more embodiments of this aspect, the initial context setup failure message includes a supported reliability level for each service associated with one of the at least one service reliability targets. According to one or more embodiments of this aspect, the at least one service reliability target is included in a reliability profile. The reliability profile is used to allocate system resources based at least in part on at least one of an existing guaranteed reliability level for a service type, a resource availability status, a resource level of utilization, an ability of different configurations to meet different existing guaranteed reliability targets and differentiated wireless device handling. According to one or more embodiments of this aspect, key performance indicators of reliability levels obtained when operating based at least in part on the at least one service reliability target are monitored. According to one or more embodiments of this aspect, each at least one service reliability target corresponds to a maximum reliability value required for any bearer associated with an initial context request. According to one or more embodiments of this aspect, the indication whether the one of the at least one service reliability targets is met is based at least in part on a computation of an existing guaranteed reliability level for the at least one service associated with the at least one service reliability target and a comparison of the existing guaranteed reliability level the at least one service reliability target.

According to another aspect of the disclosure, an MME is configured to communicate with a network node. The MME comprises processing circuitry configured to, during admission control, cause transmission, to the network node, of an indication of at least one service reliability target associated with at least one service and receive, from the network node, an indication of whether one of the at least one service reliability targets is met.

According to one or more embodiments of this aspect, the indication of at least one service reliability target is provided by a wireless device. According to one or more embodiments of this aspect, the causing of transmission of the indication of at least one service reliability target includes sending, to the network node, an initial context setup request message. According to one or more embodiments of this aspect, the processing circuitry is further configured to receive one of an initial context setup failure message and an initial context setup response message, the indication of whether the one of the at least one service reliability targets is met being provided by one of the initial context setup failure message and the initial context setup response message. According to one or more embodiments of this aspect, the initial context setup failure message includes a supported reliability level for the service associated with the at least one service reliability target.

According to one or more embodiments of this aspect, the at least one service reliability target is included in a reliability profile and the processing circuitry is further configured to use the reliability profile to allocate system resources based at least in part on at least one of an existing guaranteed reliability level for a service type, a resource availability status, a resource level of utilization, an ability of different configurations to meet different existing guaranteed reliability targets and differentiated wireless device handling. According to one or more embodiments of this aspect, the processing circuitry is further configured to monitor key performance indicators of reliability levels obtained when operating based at least in part on the at least one service reliability target. According to one or more embodiments of this aspect, each at least one service reliability target corresponds to a maximum reliability value required for any bearer associated with an initial context request. According to one or more embodiments of this aspect, the indication whether the one of the at least one service reliability targets is met is based at least in part on a computation of an existing guaranteed reliability level for the at least one service associated with the at least one service reliability target and a comparison of the existing guaranteed reliability level to the at least one service reliability target.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

FIG. 11 is an illustration of a reliability profile according to some embodiments of the present disclosure; and FIG. 12 is another illustration of the use of a reliability profile to determine a context setup message according to some embodiments of the present disclosure.

DETAILED DESCRIPTION

Figure 1:
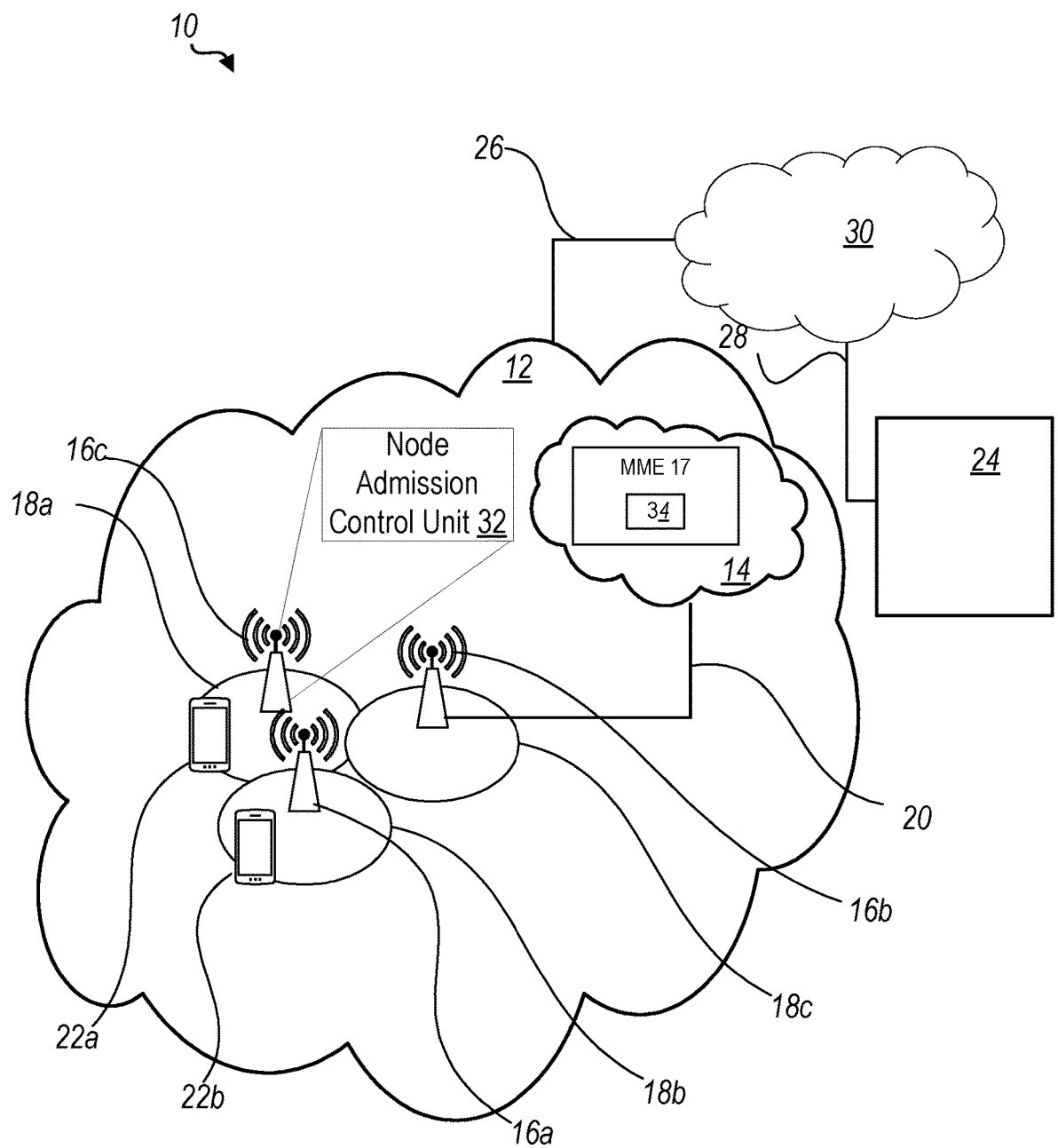
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in the combinations of apparatus components and processing steps related to a subscriber and/or service based radio access network reliability based at least in part on, for example, minimal reliability level guarantees, applicable to one or more aspects of reliability specified by the 3GPP standard such as network packet layer transmissions, communications service availability, data distribution, prioritized resource allocation, etc. and to specific services, like PTT. The model may be based on reliability profiles, each one including specific levels (i.e., reliability targets) for specified reliability aspects. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for a subscriber and/or service-based radio access network reliability based at least in part on reliability levels such as on, for example, minimal reliability level guarantees, applicable to one or more aspects of reliability. The model may be based on reliability profiles, each one including specific levels (i.e., reliability targets) for specified reliability aspects.

Referring again to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The core network 14 includes mobility management entity (MME) 17. An MME is a control-node for a radio network. MME 17 is involved in the bearer activation/deactivation process and may be responsible for choosing the serving gateway for wireless device 22 at the initial attach.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a node admission control unit 32 which is configured to use at least one service reliability target such as in a reliability profile as described herein. MME 17 is configured to include an MME admission control unit 34 which is configured to use at least one reliability target such as in a reliability profile in connection with the network node 16 as described herein. In various embodiments, network node 16 during admission control, receives a set of reliability targets from MME admission control unit 34, each reliability target of the set of reliability targets corresponding to a target value for reliability for a respective service, determines whether the set of reliability targets are met and, if the set of reliability targets are met, configures an initial context for at least one service indicated by a service identification.

Example implementations, in accordance with an embodiment, of the WD 22, network node 16, MME 17 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include node admission control unit 32 configured to use a reliability profile, as described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

The communication system 10 further includes MME 17 configured to use a reliability profile, as described herein. The MME 17 may have hardware 94 that may include a communication interface 96 and/or radio interface 98 configured to set up and maintain a wired or wireless connection with an interface of a different communication device, such as another entity in the core network, network node 16, WD 22 and/or host computer 24, of the communication system 10. The radio interface 98 may be formed as or may include, for example, one or more RF transmitters, one or more RF receivers, and/or one or more RF transceivers.

MME 17 has processing circuitry 100 that may be configured to control any of the methods and/or processes described herein and/or to cause such methods, and/or processes to be performed, e.g., by MME 17. Processor 102 corresponds to one or more processors 102 for performing MME 17 functions described herein. The MME 17 includes memory 104 that is configured to store data, programmatic software code and/or other information described herein. In some embodiments, the software 106 and/or the MME admission control unit 34 may include instructions that, when executed by the processor 102 and/or processing circuitry 100, causes the processor 102 and/or processing circuitry 100 to perform the processes described herein with respect to MME 17. The instructions may be software associated with MME 17. For example, the processing circuitry 100 of the MME 17 may include an MME admission control unit 34 configured to use a reliability profile, as described herein. MME 17 is the control-node for a radio network. MME admission control unit 34 is configured to enable the service provider to provide MME admission control for the network node 16 and or the WD 22 as described herein.

Figure 2:
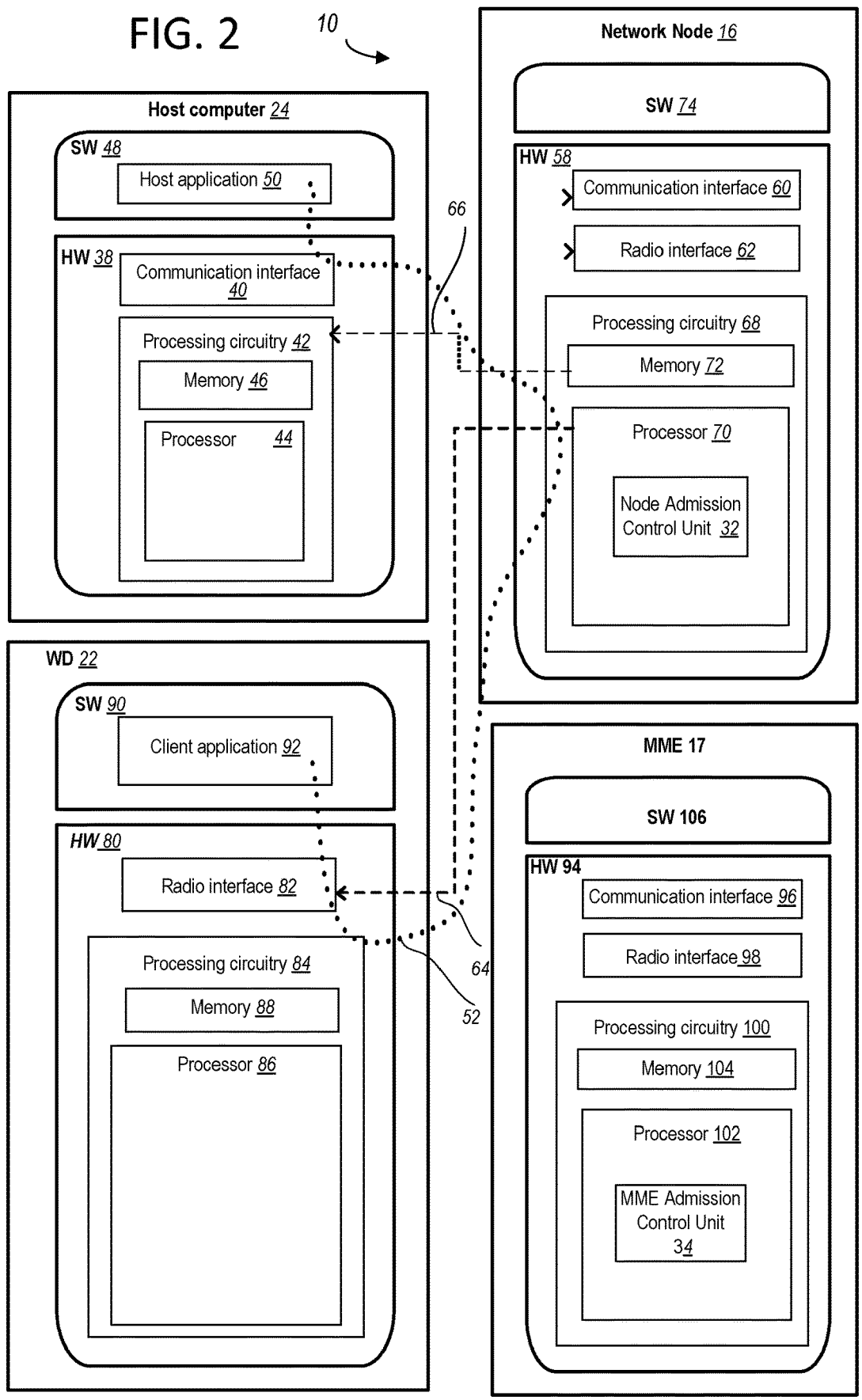
FIG. 2 is a block diagram of a host computer communicating via a network node with a wireless device over an at least partially wireless connection according to some embodiments of the present disclosure.

In some embodiments, the inner workings of the network node 16, MME 17, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both.

While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as MME admission control unit 34 and node admission control unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
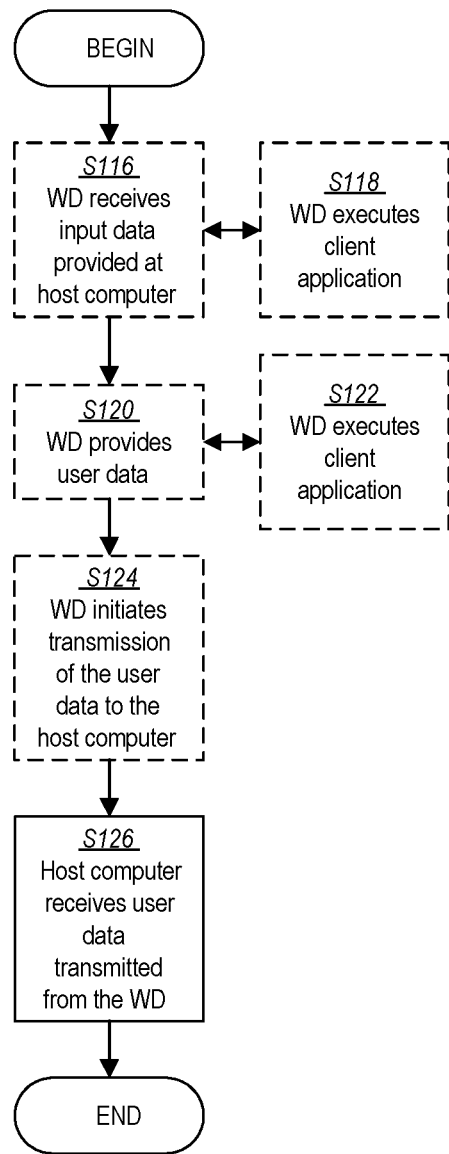
FIG. 5 is a flowchart illustrating exemplary methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally, or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
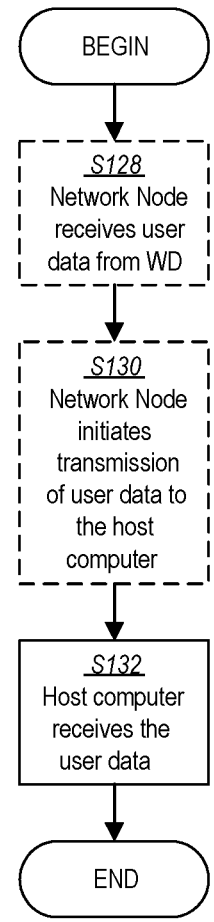
FIG. 6 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
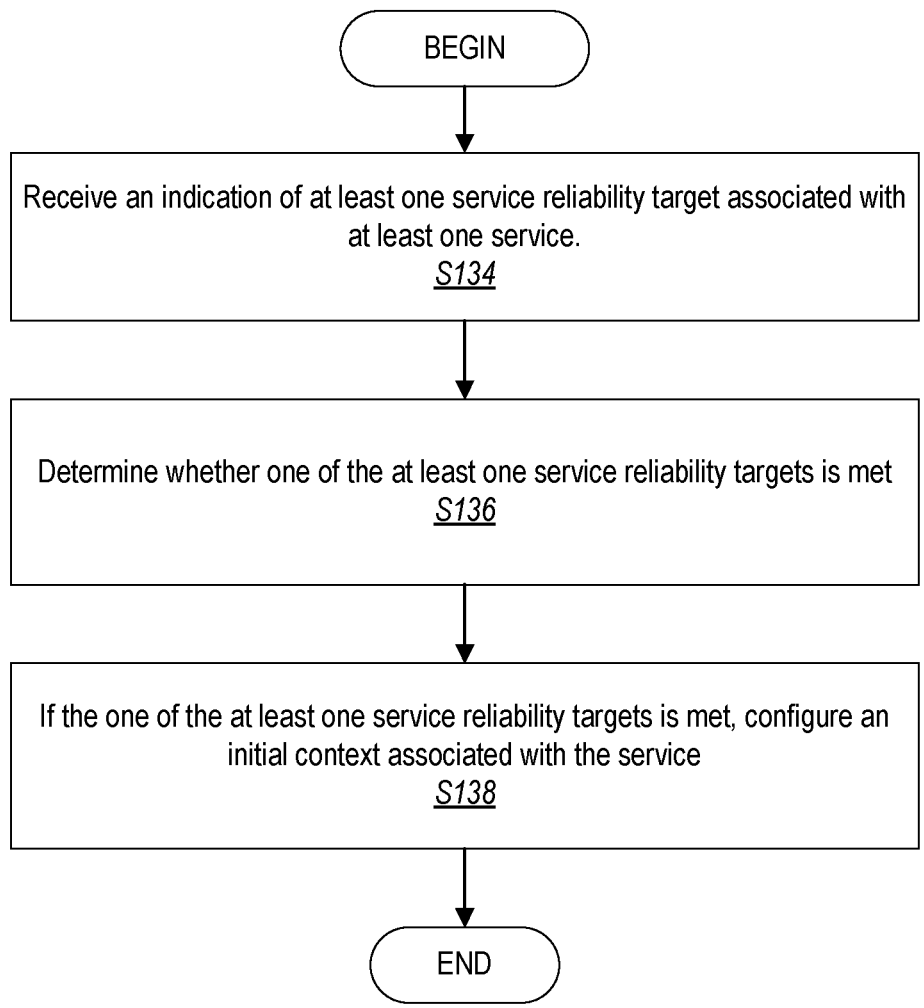
FIG. 7 is a flowchart of an exemplary process in a network node during admission control according to some embodiments of the present disclosure.

FIG. 7 is a flowchart of an exemplary process in a network node 16 during admission control according to some embodiments of the present disclosure. One or more Blocks and/or functions performed by the network node 16 may be performed by one or more elements of network node 16 such as by node admission control unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to receive (Block S134) an indication of at least one service reliability target associated with at least one service. In one or more embodiments, network node 16 such as via one or more of processing circuitry 68, processor 70, radio interface 62 and communication interface 60 is configured to determine (Block S136) whether one of the at least one service reliability targets is met. In one or more embodiments, network node 16 such as via one or more of processing circuitry 68, processor 70, radio interface 62 and communication interface 60 is configured to, if the one of the at least one service reliability targets is met, configure (Block S138) an initial context associated with the service.

In one or more embodiments, network node 16 such as via one or more of processing circuitry 68, processor 70, radio interface 62 and communication interface 60 is configured to, if the one of the at least one service reliability targets is met, cause transmission of an indication that the initial context associated with the at least one service has been configured. In one or more embodiments, network node 16 such as via one or more of processing circuitry 68, processor 70, radio interface 62 and communication interface 60 is configured to, if the one of the at least one service reliability targets is not met, cause transmission of an indication that the initial context associated with the at least one service has not been configured.

In one or more embodiments, the receiving of the indication of at least one service reliability target associated with at least one service includes receiving, from MME 17, an initial context setup request message. In one or more embodiments, network node 16 such as via one or more of processing circuitry 68, processor 70, radio interface 62 and communication interface 60 is configured to, if the one of the at least one service reliability targets is not met, send MME 17 an initial context setup failure message. In one or more embodiments, the initial context setup failure message includes a list of reliability levels supported by the node, the list comprising a reliability level for each service associated with the at least one service reliability targets. In one or more embodiments, network node 16 such as via one or more of processing circuitry 68, processor 70, radio interface 62 and communication interface 60 is configured to, if the one of the at least one service reliability target is met, cause transmission of an initial context setup response message to MME 17.

In one or more embodiments, the at least one service reliability target is included in a reliability profile and the method further comprises using the reliability profile to allocate system resources based at least in part on at least one of an existing guaranteed reliability level for a service type, a resource availability status, a resource level of utilization, an ability of different configurations to meet different existing guaranteed reliability targets and a differentiated wireless device 22 handling feature. In one or more embodiments, network node 16 such as via one or more of processing circuitry 68, processor 70, radio interface 62 and communication interface 60 is configured to monitor key performance indicators of reliability levels obtained when operating based at least in part on the at least one service reliability target.

In one or more embodiments, each of the at least one service reliability targets corresponds to a maximum reliability value required for any bearer associated with an initial context request. In one or more embodiments, determining whether the one of the at least one service reliability targets is met further includes computing an existing guaranteed reliability level for the at least one service associated with the at least one service reliability target and comparing the existing guaranteed reliability level to the at least one service reliability target. In one or more embodiments, network node 16 such as via one or more of processing circuitry 68, processor 70, radio interface 62 and communication interface 60 is configured to receive, from a wireless device 22, the indication of at least one service reliability target in association with an initial context setup request.

Figure 8:
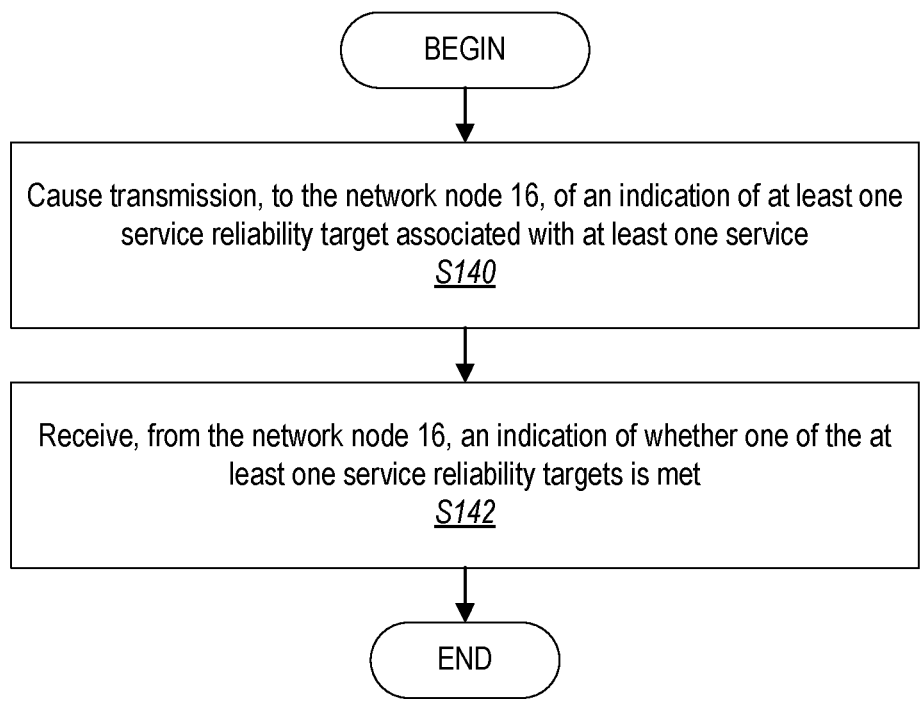
FIG. 8 is a flowchart of an exemplary process in an MME during admission control according to some embodiments of the present disclosure.

FIG. 8 is a flowchart of an exemplary process in MME 17 during admission control according to some embodiments of the present disclosure. One or more Blocks and/or functions performed by MME 17 may be performed by one or more elements of MME 17 such as by MME admission control unit 34 in processing circuitry 100, processor 102, communication interface 96, etc. In one or more embodiments, MME 17 such as via one or more of processing circuitry 100, processor 102 and communication interface 96 is configured to cause (Block S140) transmission, to the network node 16, of an indication of at least one service reliability target associated with at least one service. In one or more embodiments, MME 17 such as via one or more of processing circuitry 100, processor 102 and communication interface 96 is configured to receive (Block S142), from the network node 16, an indication of whether one of the at least one service reliability targets is met.

In one or more embodiments, the indication of at least one service reliability target is provided by a wireless device 22. In one or more embodiments, the causing of transmission of the indication of at least one service reliability target includes sending, to the network node 16, an initial context setup request message. In one or more embodiments, MME 17 such as via one or more of processing circuitry 100, processor 102 and communication interface 96 is configured to receive one of an initial context setup failure message and an initial context setup response message, the indication of whether the one of the at least one service reliability targets is met being provided by one of the initial context setup failure message and the initial context setup response message. In one or more embodiments, the initial context setup failure message includes a supported reliability level for the service associated with the at least one service reliability target. In one or more embodiments, the at least one service reliability target is included in a reliability profile and the processing circuitry 100 is further configured to use the reliability profile to allocate system resources based at least in part on at least one of an existing guaranteed reliability level for a service type, a resource availability status, a resource level of utilization, an ability of different configurations to meet different existing guaranteed reliability targets and differentiated wireless device 22 handling.

In one or more embodiments, MME 17 such as via one or more of processing circuitry 100, processor 102 and communication interface 96 is configured to monitor key performance indicators of reliability levels obtained when operating based at least in part on the at least one service reliability target. In one or more embodiments, each at least one service reliability target corresponds to a maximum reliability value required for any bearer, i.e., radio bearer, associated with an initial context request. In one or more embodiments, the indication whether the one of the at least one service reliability targets is met is based at least in part on a computation of an existing guaranteed reliability level for the at least one service associated with the at least one service reliability target and a comparison of the existing guaranteed reliability level to the at least one service reliability target.

Having described the general process flow of arrangements of the disclosure and having provided examples of hardware and software arrangements for implementing the processes and functions of the disclosure, the sections below provide details and examples of arrangements for providing a subscriber and/or service based at least in part on radio access network reliability based at least in part on reliability levels such as, for example, minimal reliability level guarantees, applicable to one or more aspects of reliability specified by the 3GPP standard such as network packet layer transmissions, communications service availability, data distribution, prioritized resource allocation, etc. and to specific services, like PTT.

One or more embodiments provide advantages from the operators' perspective. These advantages may include optimizing the price/benefit ratio regarding the levels of reliability of end user guaranteed services specially for MCC for public safety and industrial internet-of-things (IoT), the ability to specify expected minimal levels for a variety of reliability aspects, including services, and the ability to measure actual reliability levels.

One or more embodiments provide advantages from the vendors' perspective. These advantages may include the ability to offer a variety of packages at different levels of reliability, and packages guaranteeing higher reliability levels are likely to command higher prices. Further, new reliability aspects/services can be integrated into the system. Vendors also have the ability to select an appropriate configuration and set of features to handle a particular NR bearer based at least in part on the desired minimal reliability levels, i.e., service reliability targets. In one or more embodiments, service reliability targets may correspond and/or indicate a metric such as a reliability value or quantity.

One or more embodiments include a model based at least in part on reliability levels (i.e., service reliability target(s)) such as, for example, minimal reliability level guarantees, applicable to one or more aspects of reliability specified by the 3GPP standard, network packet layer transmissions, communications service availability, data distribution, prioritized resource allocation, and to specific services, like PTT. The model may be based on reliability profiles, each one including specific reliability levels (also referred to as service reliability targets), i.e., a number of nines (N-9s), for reliability aspects. A mechanism may allow operators to define reliability profiles, as described herein. A mechanism may also allow a wireless device 22 to indicate to the network node 16 the desired reliability profile at the time of the Initial Context Setup Request, as described herein.

One or more embodiments provide one or more mechanisms implemented by the network node 16 to allow the network node 16 to use information from the reliability profile to meet the expected reliability level in one or more aspects and optimize hardware and software requirement allocation and usage. One or more embodiments utilize Key Performance Indicators (KPIs) and metrics describing the actual reliability levels. One or more embodiments provide a service reliability-based admission control mechanism that extends the 3GPP S1AP scenario Initial Context Setup by having the MME 17 pass a reliability profile to the network node 16 to indicate the required minimum levels of reliability for specific services.

Figure 9:
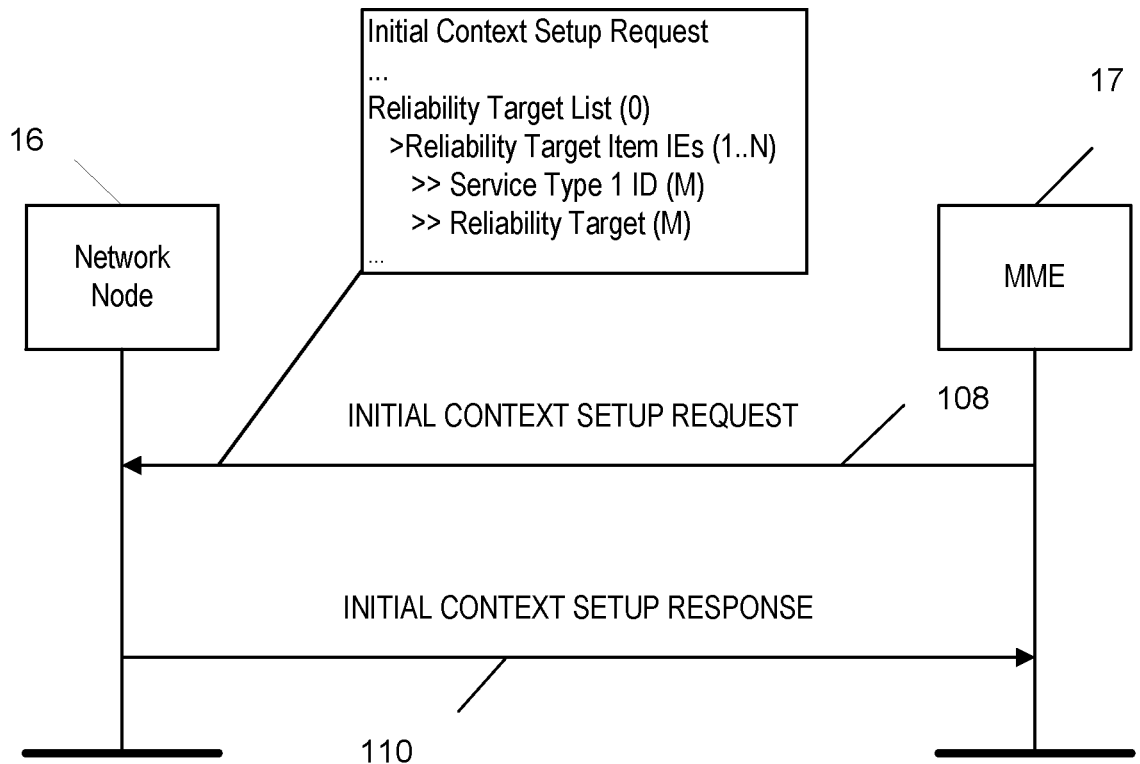
FIG. 9 is an illustration of the use a reliability profile during an Initial Context Setup Request when the reliability targets are met according to some embodiments of the present disclosure.
Figure 10:
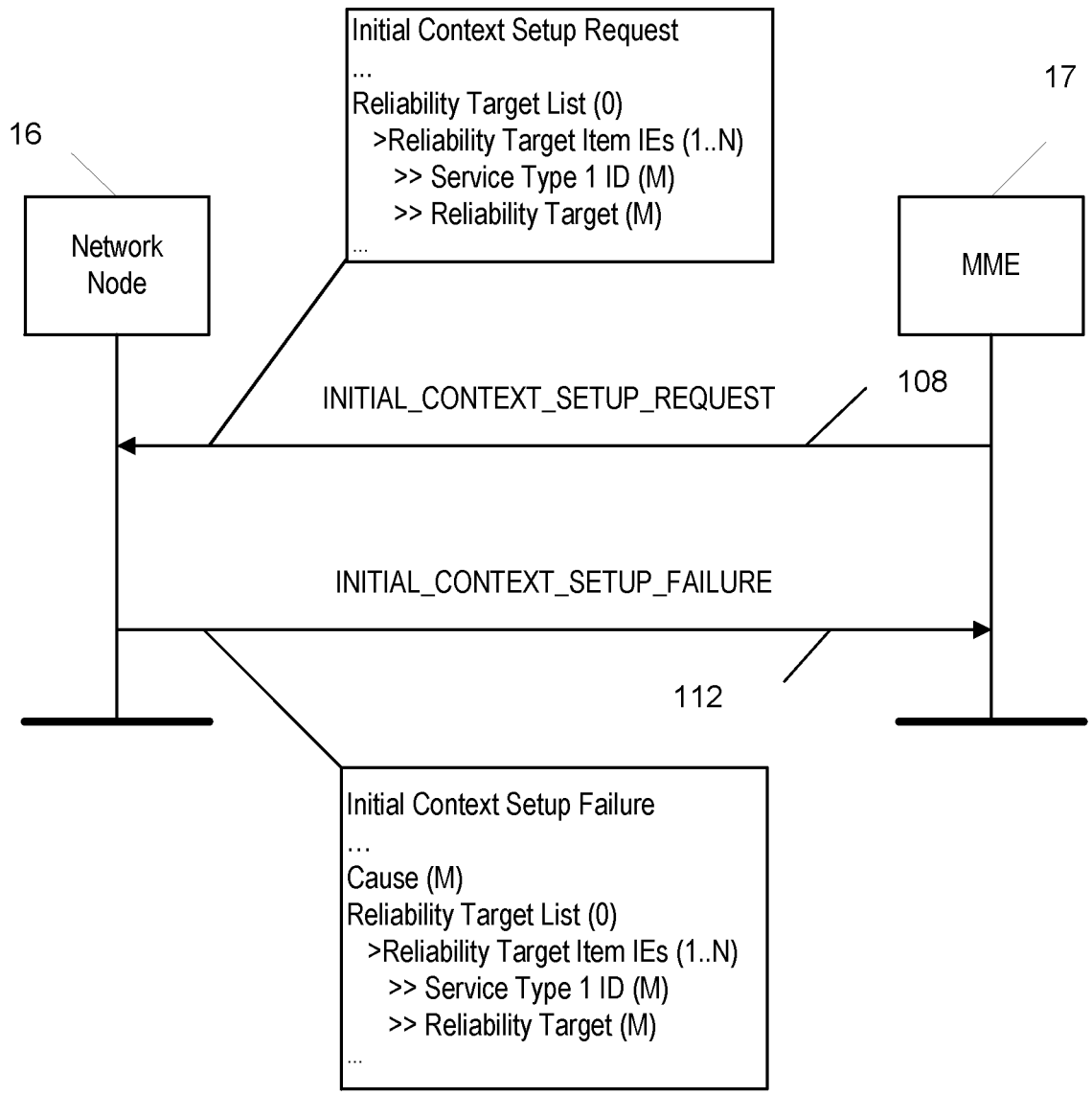
FIG. 10 is an illustration of the use a reliability profile during an Initial Context Setup Request when at least one reliability targets is not met according to some embodiments of the present disclosure.

FIG. 9 is an illustration of the use a reliability profile during an Initial Context Setup Request when the reliability targets are met according to some embodiments of the present disclosure. FIG. 10 is an illustration of the use a reliability profile during an Initial Context Set Request when at least one reliability targets is not met according to some embodiments of the present disclosure.

Referring to FIGS. 9 and/or 10, The INITIAL_CONTEXT_SETUP_REQUEST message 108 may contain a Reliability Target List structure corresponding to a reliability profile such as reliability profile 114 in FIG. 11. The Reliability Target List contains one or multiple Reliability Target Item Information Element (IE) instances. Each Reliability Target Item IE may contain a Service Type id, e.g. MC PTT id, and/or a minimum reliability target level (i.e., service reliability target) (e.g. 99.9999%).

In case of a wireless device 22 requiring guaranteed service reliability the MME 17 fills in the Reliability Target List with appropriate information such as to help meet the requirements of wireless device 22. The reliability target level (i.e., service reliability target) for a given service may be set to the maximum value considering all radio bearers, present in the INITIAL_CONTEXT_SETUP_REQUEST 108 or to be subsequently added. For example, in case of a request containing two radio bearers, one requiring MCC, the other not, the reliability target level may be set according to MCC. Even if both radio bearers are non-MCC, but the intent is to potentially add an MCC bearer later on, the reliability target level may be set to MCC.

Upon receiving the INITIAL_CONTEXT_SETUP_REQUEST message 108, in the case where a Reliability Target List is specified, the network node 16 computes the currently guaranteed reliability level for each service type where the currently guaranteed reliability level for each service type may correspond to one or more values such as reliability values. The computation may include resource availability status, resource level of utilization, ability for different configurations to meet different guaranteed reliability targets, active admission control features and differentiated wireless device handling features.

If the network node 16 can meet one or more of the minimum service reliability targets then the network node 16 replies to the MME 17 with an INITIAL_CONTEXT_SETUP_RESPONSE message 110 as shown in FIG. 9, based on the assumption that all other common setup conditions are met. In one or more embodiments, the network node may determine if all of the minimum service reliability targets are met.

If the network node 16 cannot meet one or more of the minimum service reliability targets then the network node 16 replies to the MME 17 with an INITIAL_CONTEXT_SETUP_FAILURE message 112 as shown in FIG. 10, indicating in the cause field that the reliability requirements could not be met and including a list of reliability targets supported by the network node 16.

FIG. 11 is an illustration of a reliability profile 114 according to some embodiments of the present disclosure. The first three entries are associated with services defined in 3GPP Release 16 while the others are custom services. While reliability profile 114 is illustrated as including various services (i.e., under the "Reliability Metric" column) and corresponding service reliability targets (e.g., 99.9999%, etc.), the reliability profile may include one or more of one or more service reliability targets associated with one or more services and one or more service identifiers associated with the reliability targets. Further, while the reliability profile 114 may include one or more service reliability targets corresponding to a minimum level or minimum service reliability target, the reliability profile 114 is not limited to indicating minimum levels, and other reliability levels/values may be indicated in accordance with the teachings of the disclosure.

FIG. 12 is an illustration of the use of a reliability profile 116 to determine a context setup message according to some embodiments of the present disclosure. The reliability profile 116 contains a list of service identifications for three services, Services 1-3, and the corresponding reliability targets, Targets 1-3, for each service identification. Table 118 sets forth the context setup message results based on the use of reliability profile 116 by network node 16 under four different potential scenarios. In scenario 1, Targets 1-3 are all met and the context setup message sent by network node 16, such as an INITIAL_CONTEXT_SETUP_RESPONSE, indicates success of the initial context setup. If, as shown in scenario 2, Target 2 is not met, but Targets 1 and 3 are met, the context setup message sent by network node 16, such as an INITIAL_CONTEXT_SETUP_FAILURE, indicates failure of the initial setup. If, as shown in scenario 3, Targets 2 and 3 are not met, but Target 1 is met, the context setup message again indicates failure of the initial context setup. Similarly, as shown in scenario 4, if none of the targets is met, the context setup message indicates failure of the initial context setup. Thus, in embodiments such as shown in FIG. 12, an initial context setup response that indicates success is only sent if all the Targets 1-3 are met.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method performed by a network node during admission control, the method comprising:
receiving an indication of at least one service reliability target associated with at least one service;
determining whether one of the at least one service reliability targets is met; and
if the one of the at least one service reliability targets is met, configuring an initial context associated with the service, wherein determining whether the at least one service reliability target is met further includes computing an existing guaranteed reliability level for the at least one service associated with the at least one service reliability target and comparing the existing guaranteed reliability level to the at least one service reliability target.

2. The method of claim 1, further comprising,
if the one of the at least one service reliability targets is met, causing transmission of an indication that the initial context associated with the at least one service has been configured, and/or
if the one of the at least one service reliability targets is not met, causing transmission of an indication that the initial context associated with the at least one service has not been configured; and/or
wherein the receiving of the indication of at least one service reliability target associated with at least one service includes receiving, from a mobility management entity (MME) an initial context setup request message.

3. The method of claim 1, further comprising, if the one of the at least one service reliability targets is not met, sending the MME an initial context setup failure message; and
wherein the initial context setup failure message includes a list of reliability levels supported by the network node, the list comprising a reliability level for each service associated with the at least one service reliability targets; and/or the method further comprising, if the one of the at least one service reliability target is met, causing transmission of an initial context setup response message to the MME.

4. The method of claim 1, wherein the at least one service reliability target is included in a reliability profile; and
the method further comprising using the reliability profile to allocate system resources based at least in part on at least one of an existing guaranteed reliability level for a service type, a resource availability status, a resource level of utilization, an ability of different configurations to meet different existing guaranteed reliability targets and a differentiated wireless device handling feature; and/or
the method further comprising monitoring key performance indicators of reliability levels obtained when operating based at least in part on the at least one service reliability target, and/or
wherein each of the at least one service reliability targets corresponds to a maximum reliability value required for any bearer associated with an initial context request.

5. The method of claim 1, further comprising receiving, from a wireless device, the indication of at least one service reliability target in association with an initial context setup request.

6. A network node comprising processing circuitry configured to, during admission control:
receive an indication of at least one service reliability target associated with at least one service;
determine whether one of the at least one service reliability targets is met; and
if the one of the at least one service reliability targets is met, configure an initial context associated with the service.

7. The network node of claim 6, wherein the processing circuitry is further configured to:
if the one of the at least one service reliability targets is met, cause transmission of an indication that the initial context associated with the at least one service has been configured, and/or
if the one of the at least one service reliability targets is not met, cause transmission of an indication that the initial context associated with the at least one service has not been configured; and/or
wherein processing circuitry is further configured to receive the indication of the at least one service reliability target includes receiving, from a mobility management entity (MME) an initial context setup request message.

8. The network node of claim 6, wherein the processing circuitry is further configured to, if the one of the at least one service reliability targets is not met, send the MME an initial context setup failure message; and
wherein the initial context setup failure message includes a list of reliability levels supported by the network node, the list comprising a reliability level for each service associated with the at least one service reliability targets; and/or
wherein the processing circuitry is further configured to, if the one of the at least one service reliability targets is met, cause transmission of an initial context setup response message to the MME.

9. The network node of claim 6, wherein the at least one service reliability target is included in a reliability profile; and
wherein the processing circuitry is further configured to use the reliability profile to allocate system resources based at least in part on at least one of an existing guaranteed reliability level for a service type, a resource availability status, a resource level of utilization, an ability of different configurations to meet different existing guaranteed reliability targets and a differentiated wireless device handling feature; and/or
wherein the processing circuitry is further configured to monitor key performance indicators of reliability levels obtained when operating based at least in part on the at least one service reliability target; and/or
wherein each at least one service reliability target corresponds to a maximum reliability value required for any bearer associated with an initial context request.

10. A method performed by a mobility management entity (MME) during admission control, the MME being configured to communicate with a network node, the method comprising:
causing transmission, to the network node, of an indication of at least one service reliability target associated with at least one service; and
receiving, from the network node, an indication of whether one of the at least one service reliability targets is met, wherein the indication whether the one of the at least one service reliability targets is met is based at least in part on a computation of an existing guaranteed reliability level for the at least one service associated with the at least one service reliability target and a comparison of the existing guaranteed reliability level the at least one service reliability target.

11. The method of claim 10, wherein the at least one service reliability target is provided by a wireless device; and wherein the causing of transmission of the indication includes sending, to the network node, an initial context setup request message.

12. The method of claim 10, further comprising receiving one of an initial context setup failure message and an initial context setup response message, the indication of whether the one of the at least one service reliability targets is met being provided by one of the initial context setup failure message and the initial context setup response message; and/or
wherein the initial context setup failure message includes a supported reliability level for each service associated with one of the at least one service reliability targets.

13. The method of claim 10, wherein the at least one service reliability target is included in a reliability profile; and
the method further comprising using the reliability profile to allocate system resources based at least in part on at least one of an existing guaranteed reliability level for a service type, a resource availability status, a resource level of utilization, an ability of different configurations to meet different existing guaranteed reliability targets and differentiated wireless device handling; and/or
monitoring key performance indicators of reliability levels obtained when operating based at least in part on the at least one service reliability target; and/or
wherein each at least one service reliability target corresponds to a maximum reliability value required for any bearer associated with an initial context request.

14. A mobility management entity (MME) configured to communicate with a network node, the MME comprising processing circuitry configured to, during admission control:
cause transmission, to the network node, of an indication of at least one service reliability target associated with at least one service; and receive, from the network node, an indication of whether one of the at least one service reliability targets is met, wherein the indication whether the one of the at least one service reliability targets is met is based at least in part on a computation of an existing guaranteed reliability level for the at least one service associated with the at least one service reliability target and a comparison of the existing guaranteed reliability level to the at least one service reliability target.

15. The MME of claim 14, wherein the indication of at least one service reliability target is provided by a wireless device; and wherein the causing of transmission of the indication of at least one service reliability target includes sending, to the network node, an initial context setup request message.

16. The MME of claim 14, wherein the processing circuitry is further configured to receive one of an initial context setup failure message and an initial context setup response message, the indication of whether the one of the at least one service reliability targets is met being provided by one of the initial context setup failure message and the initial context setup response message; and/or wherein the initial context setup failure message includes a supported reliability level for the service associated with the at least one service reliability target.

17. The MME of claim 14, wherein the at least one service reliability target is included in a reliability profile; and
the processing circuitry is further configured to use the reliability profile to allocate system resources based at least in part on at least one of an existing guaranteed reliability level for a service type, a resource availability status, a resource level of utilization, an ability of different configurations to meet different existing guaranteed reliability targets and differentiated wireless device handling; and/or
wherein the processing circuitry is further configured to monitor key performance indicators of reliability levels obtained when operating based at least in part on the at least one service reliability target; and/or
wherein each at least one service reliability target corresponds to a maximum reliability value required for any bearer associated with an initial context request.

* * * * *